United States Patent [19]

Chapman

[11] 3,804,027

[45] Apr. 16, 1974

[54] FREIGHT BRACING METHOD AND REMOVABLE AIR BULKHEAD THEREFOR

[75] Inventor: Harvey W. Chapman, Detroit, Mich.

[73] Assignee: Evans Products Company, Plymouth, Mich.

[22] Filed: Feb. 28, 1972

[21] Appl. No.: 229,634

[52] U.S. Cl. ...... 105/369 BA, 105/376, 214/10.5 D
[51] Int. Cl. .................... B60p 7/14, B61d 45/00
[58] Field of Search ......... 105/369 BA, 369 S, 376; 214/10.5 BI, 38 D

[56] References Cited
UNITED STATES PATENTS

| | | | |
|---|---|---|---|
| 2,856,867 | 10/1968 | Dasey | 105/369 BA |
| 3,145,853 | 8/1964 | Langenberg | 105/369 BA |
| 3,427,997 | 2/1969 | Brown, Jr. et al. | 105/369 BA |
| 3,593,672 | 7/1971 | Breen et al. | 105/376 |
| 3,177,816 | 4/1965 | Daberkow | 105/369 BA |
| 3,554,135 | 1/1971 | Duvall | 105/369 BA |
| 3,673,968 | 7/1972 | Bertram | 105/369 BA |
| 3,083,879 | 4/1963 | Coleman | 214/38 D |
| 3,680,491 | 8/1972 | Chapman et al. | 105/376 |
| 3,680,492 | 8/1972 | Weage | 105/376 |

Primary Examiner—Drayton E. Hoffman
Attorney, Agent, or Firm—Harness, Dickey & Pierce

[57] ABSTRACT

A system for bracing freight in a railway car embodying an air bulkhead assembly that is removable as a unit from the car and which may be placed between the freight in the car through the doorway opening for bracing the freight during transit. The air bulkhead assembly includes a pair of substantially rigid panels each of which is adapted to engage a face of the freight. Inflatable air bags are positioned between the panels for altering the spacing between the panels and for cushioning impact loading upon the freight. A linkage system is provided for maintaining the panels supported from an elongated tubular member that extends across the top of the bulkhead assembly and facilitates its handling by means of a fork truck or the like.

9 Claims, 3 Drawing Figures

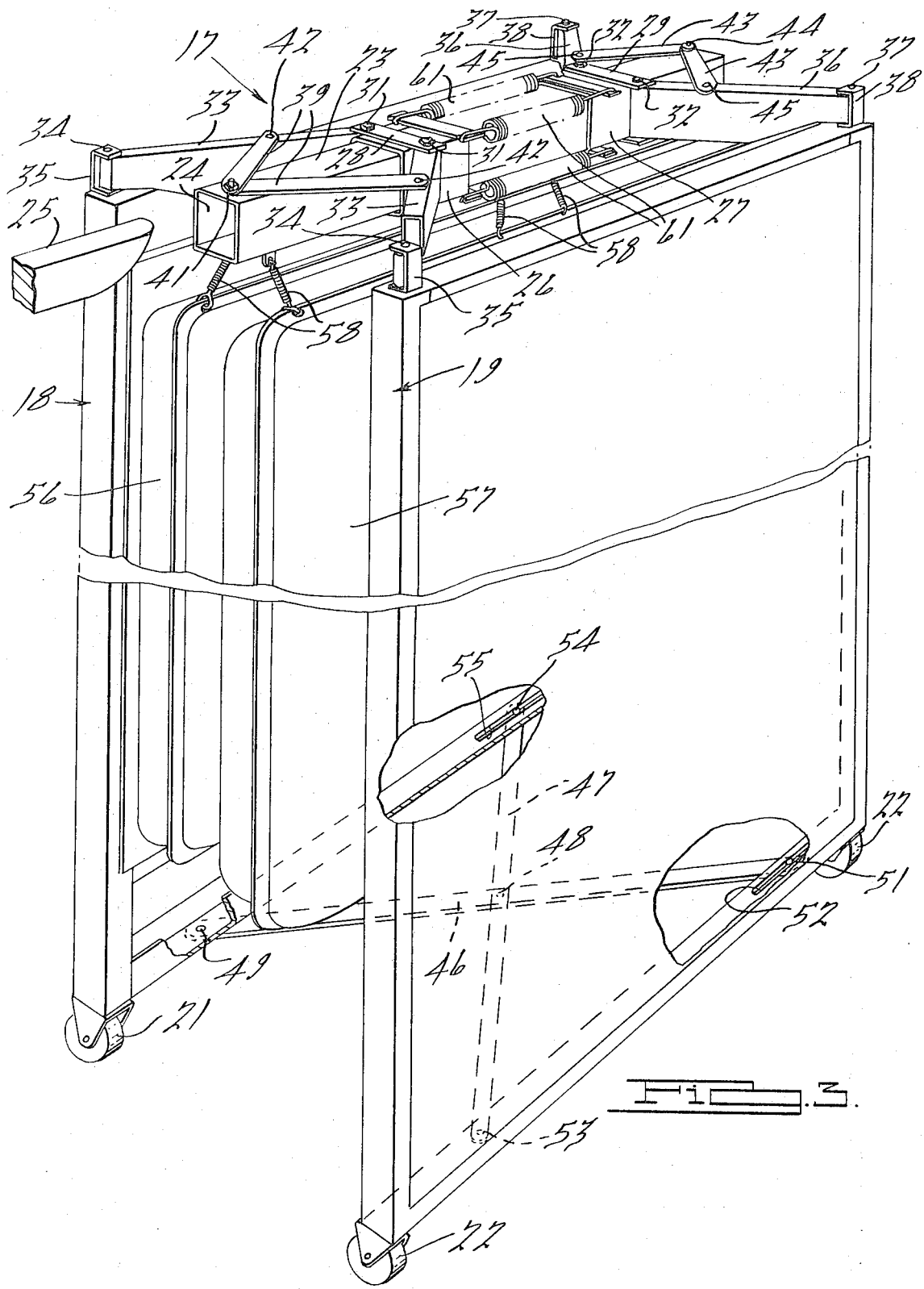

FREIGHT BRACING METHOD AND REMOVABLE AIR BULKHEAD THEREFOR

BACKGROUND OF THE INVENTION

This invention relates to a system for bracing freight and a removable bulkhead for such a system.

The necessity of bracing freight or holding it against substantial movement during shipment in a transporting vehicle such as a railroad car to prevent damage is well known. Such as bulkheads, crossbars or the like have been used for so holding the freight. Conventional bulkhead assemblies must, however, be positioned adjacent the load as closely as possible in the as loaded condition. Frequently, however, the load will shift away from the bulkhead assembly during transit making rigid holding of the freight impossible. It has been proposed to use a bulkhead assembly in which a panel that engages the freight is under air pressure from a bag or other type of air container so that the panel will follow the load if it shifts to take up voids during transit. In this way, more rigid control of the load is possible. Such an air bulkhead assembly normally includes at least two panels between which inflatable air bags are positioned. At least one of these panels is engaged with the load for providing cushioned bracing. Conventionally such a bulkhead assembly has been supported upon overhead tracks so that the bulkhead may be moved along the length of the car to preselected bracing positions. In many forms of car loading, it is only essential that the bulkhead assembly be capable of limited movement along or adjacent to the doorway opening. In addition to the cost of the overhead tracks, this type of bulkhead assembly is expensive in that a trolley structure is required for insuring smooth movement of the bulkhead assembly along the tracks. Furthermore, it is necessary that the bulkhead be locked in position when the car is being returned empty so that it will not roll along the tracks and impact against the car end walls.

It is, therefore, a principal object of this invention to provide an improved and simplified system for bracing freight.

It is another object of the invention to provide a freight bracing system embodying a removable air bulkhead assembly.

It is a further object of this invention to provide an improved removable bulkhead assembly for bracing freight.

It is a yet further object of this invention to provide an improved air bulkhead assembly that may be conveniently inserted into the cargo area and removed from the cargo area when not needed.

SUMMARY OF THE INVENTION

This invention is adapted to be embodied in a system for bracing freight in a freight transporting vehicle during transit. In such a system the freight car is loaded to a position adjacent the doorway opening. A removable bulkhead assembly having a pair of substantially rigid panels and a means for altering the spacing between these panels is then positioned between the freight through the open door. When so positioned, the bulkhead panels are spaced closely adjacent each other at a distance that is less than the distance between the respective faces of the freight loading. The spacing between the panels is then altered so as to bring the panels into bracing engagement with the respective load faces.

Another feature of this invention is adapted to be embodied in a freight bracing bulkhead assembly that is adapted to be removably positioned in a cargo carrying vehicle for bracing freight. Such a bulkhead assembly comprises first and second relatively rigid panels each adapted to engage and brace freight when positioned within the vehicle. Means are interposed between the panels for altering the distance between the panels and for urging the panels into engagement with the freight. The bulkhead assembly includes means for facilitating its lifting from a position outside the cargo carrying vehicle to a position within the cargo carrying vehicle for engagement of the panels with the freight.

BRIEF DESCRIPTION OF THE DRAWINGS

FIG. 3 is an enlarged perspective view of a freight bracing bulkhead assembly embodying the invention, with portions broken away to more clearly show the construction.

DETAILED DESCRIPTION OF THE PREFERRED EMBODIMENT

Figures 1, 2:
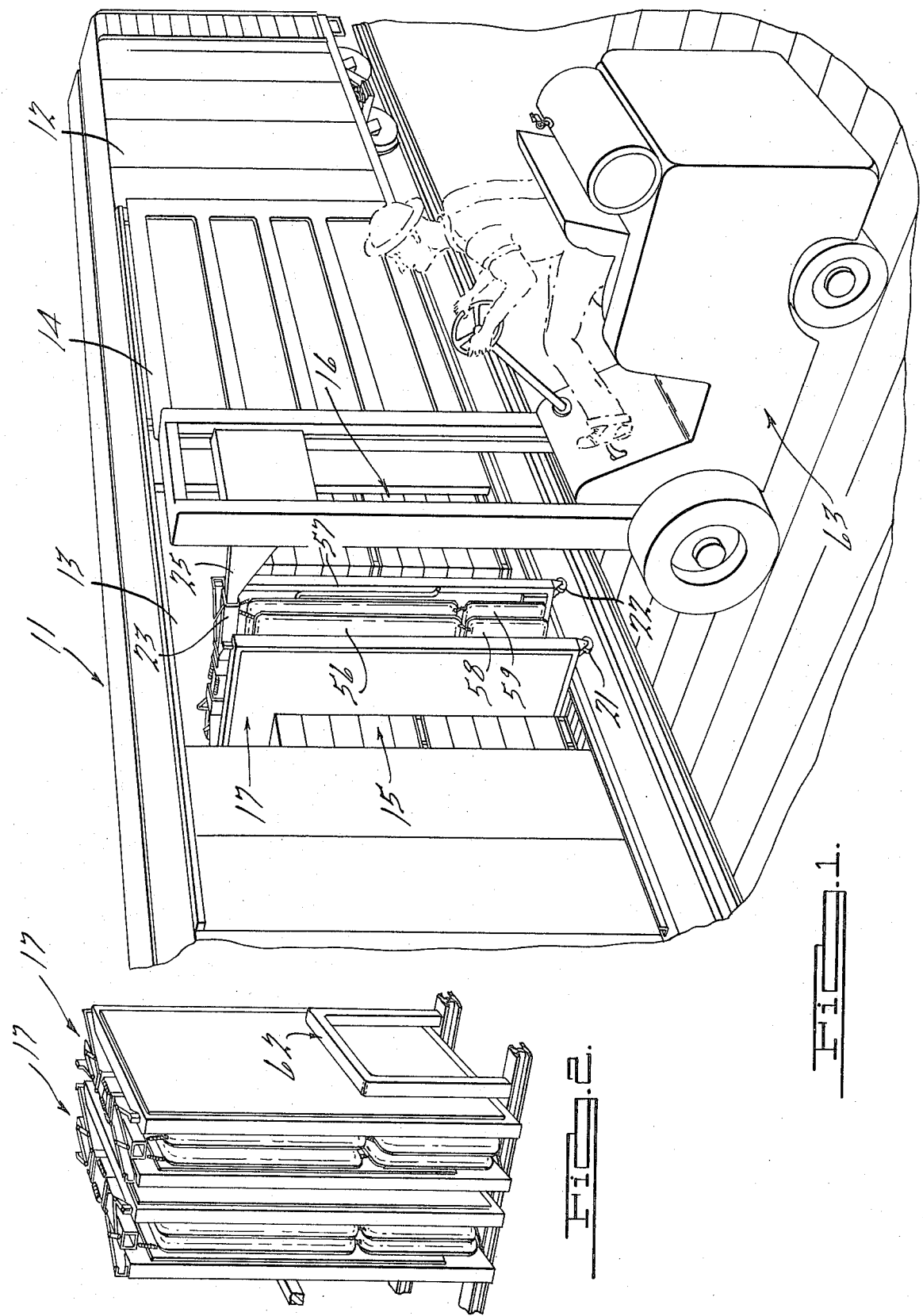
FIG. 1 is a perspective view showing a freight bracing system embodying this invention.
FIG. 2 is a perspective view showing a system for storing freight bracing bulkhead assemblies embodying this invention.

This invention is particularly adapted to be embodied for bracing freight in a freight transporting vehicle such as a railroad car, indicated generally by the reference numeral 11 in FIG. 1. The car 11 is of the box car type and includes opposite side walls 12 (only one of which appears in the drawings) in which a doorway opening 13 is provided. A sliding door 14 is carried by the car for closing the doorway opening 13. Freight is loaded into the car 11 in two loads each extending from a respective end wall to a point that extends into the doorway opening 13. These two unit loads of freight are indicated by the reference numerals 15 and 16 (FIG. 1). A removable air bulkhead assembly, indicated generally by the reference numeral 17 is provided for insertion between the freight loads 15 and 16 for holding the freight during transit and for providing some resilient cushioning for impact loads.

The removable bulkhead assembly 17 is shown in most detail in FIG. 3 and is comprised of a pair of spaced panel assemblies 18 and 19 each of which has a reinforcing frame and a face that is adapted to engage a respective freight unit. If desired, however, the freight engaging panels 18 and 19 may be of the open framed type. The panels 18 and 19 have respective caster assemblies 21 and 22 provided at their lower corners for supporting the panels 18 and 19 on the floor of the railroad car 11 and for permitting movement of the panels 18 and 19 toward and away from each other, as will become well apparent as this description proceeds.

A lifting tube 23 extends transversely across the bulkhead assembly 17 at its upper extremity. The tube 23 defines an opening 24 that extends completely through it from one side to the other so as to receive the tine 25 of a fork truck or the like. If desired, one or both ends of the tube 23 may be formed with a bellmouthed portion so as to facilitate the rapid insertion of the tine 25.

A pair of bearing members 26 and 27 are slidably supported on the lifting tube 23. Each bearing member 26 and 27 is provided with pairs of transversely extending plates 28 and 29. The pairs of plates 28 and 29 extend outwardly beyond the sides of the respective bearing member 26 and 27 and carry pivot pins 31 and 32, respectively. A pair of links 33 are journalled at one of their ends by the pivot pins 31 and are connected by pivot pins 34 to brackets 35 carried at the upper periphery of one side of the panels 18 and 19. In a like manner, links 36 are pivotally supported at one of their ends by the pivot pins 32. The opposite ends of the links 36 are connected by pivot pins 37 to brackets 38 carried at the opposite upper sides of the panels 18 and 19.

A pair of links 39 are pivotally connected at one of their ends to the lifting tube 23 by means of a pivot pin 41. The opposite ends of the links 39 are pivotally connected to respective of the links 33, intermediate their ends, by pivot pins 42. A pair of links 43 are pivotally connected at one of their ends to the opposite end of the lifting tube 23 by a pivot pin 44. The opposite ends of these links 43 are connected to the links 36 by pivot pins 45. If desired the links 39 and 43 may be eliminated. They aid in locating the lifting tube transversely relative to the bulkhead assembly 17 and prevent shifting when struck by the fork 25. The return springs, to be described, may be sufficient to perform this purpose, however.

The described linkage system serves to support the panels 18 and 19 from the lifting tube 23. If it is desired to insure that the panels 18 and 19 maintain a parallel relationship, a pair of cross links 46 and 47 may be provided at the bottom of the panels 18 and 19. The links 46 and 47 are pivotally connected together at their midpoints by a pivot pin 48. The link 46 is connected to the panel 18 by a fixed pivot pin 49. The opposite end of the link 46 carries a pin 51 that slides in a slot 52 formed in the panel 19. The link 47 is connected to the panel 19 about a fixed pivot axis, by a pivot pin 53. A pin 54 at the other end of the link 47 slides in a slot 55 formed in the panel 18. The links 46 and 47, therefore, insure that the panels 18 and 19 will be maintained in parallel relationship to each other. If desired these links may be eliminated or may be replaced by tensioning springs that extend between the panels 18 and 19. It is preferable to place the springs in a diagonal location so as to limit the amount of expansion which the springs must undergo when the panels move from their closely adjacent positions to their fully extended positions.

The panels 18 and 19 have interposed between them a pair of upper air bags 56 and 57. The air bags 56 and 57 are suspended from the lifting tube 23 by means of suspension springs 58. A pair of lower air bags 58 and 59 (not shown in this Figure) are suspended from the bags 56 and 57, respectively. It will be noted that the bags 56 and 57 extend for approximately two thirds of the upper height of the panels 18 and 19 and the bags 58 and 59 extend for about the lower one third of their height. A manifold system (not shown) is provided so that the air bags 56 and 57 or these air bags along with the air bags 58 and 59 may be inflated so as to urge the panels 18 and 19 away from each other. A series of springs 61 are tensioned between the bearing members 26 and 27 for normally urging these members toward each other and for urging the panels 18 and 19 together. These springs will bring the panels 18 and 19 into close proximity when the air bags 56, 57, 58 and 59 are not inflated.

The bulkhead assembly 17 is freely movable within the car 11 and does not form a permanent portion of the car installation. The assembly 17 may be used, therefore, with conventional railroad cars that are not provided with bracing equipment of their own. In practice, a series of the bulkhead assemblies 17 may be stored at a loading facility in a suitably constructed rack 62 (FIG. 2) awaiting use. In this condition the air bags 56, 57, 58 and 59 are deflated and the springs 61 will hold the panels 18 and 19 in close proximity. The car 11 is then loaded with the freight units 15 and 16 to a point at which the opposing faces of these freight units are spaced apart a distance greater than the distance between the panels 18 and 19 when the air bags 56 through 59 are collapsed. The suitably constructed fork lift truck, indicated generally by the reference numeral 63 in FIG. 1, is then moved by the operator to bring the tine 25 into the hollow interior 24 of the lifting tube 23. The bulkhead assembly 17 may then be lifted from the rack 62 and moved into the area between the freight units 15 and 16 through the doorway opening 13. When so positioned, the fork truck 63 is withdrawn and the air bags 56 and 57 or these bags along with the air bags 58 and 59 are inflated to the desired pressure. Upon inflation, the panels 18 and 19 will move away from each other and into bracing relationship with the units 15 and 16. During this expansion the panels 18 and 19 are supported by the rollers 21 and 22 on the floor of the car. As is well known in this art, the air bulkhead assembly 17 will not only brace the freight units 15 and 16 during transit but will provide some cushioning against impact loads applied to these freight units.

It has been noted that the bags 56 and 57 may be inflated independently of the bags 58 and 59. Under certain types of loading it is desirable to only inflate the bags 56 and 57. With such types of loading it is impractical or undesirable to provide large air bags that span the full height of the panels 18 and 19. An example of such loading is the racks used by automotive companies to ship parts. These racks apply their loads to the upper two thirds of the bulkhead assembly and would exert a force tending to cause cocking of the panels 18 and 19 about a vertically extending plane if single air bags were employed. Alternatively, the bags 58 and 59 may be inflated independently of the bags 56 and 57. This may be desirable with certain other types of freight loading.

In addition to the aforenoted advantages, it should be noted that the bulkhead assembly 17 does not require an individual to enter the car 11 during loading. The entire loading procedure may be accomplished by means of a fork truck operator.

The described bulkhead assemblies provides access for a fork tine only from the side of the assembly. In some instances it may be desirable to provide openings in the lifting tube 23 or in some other component of the bulkhead assembly 17 so that the bulkhead assembly may be lifted from its faces. Such an arrangement would be particularly desirable when returning a number of the bulkhead assemblies 17 to the shipment point in an empty car. In such an application, the car could be loaded with the bulkhead assemblies 17 adjacent each other. The last installed bulkhead assembly could then be inflated to brace the remaining assemblies during return shipment.

A rack 62 has been disclosed for holding the bulkhead assembly 17 when not in use. Various other arrangements may be provided for this purpose. It may take a matter of minutes for the air bags to fully deflate. For this reason, the bulkhead assembly 17 may each be stored in a container having guide rails for holding one of the panel assemblies 18 or 19. The container should permit movement of the other panel assembly toward the restrained panel assembly during the deflation of the air bags. Alternatively, the bulkhead assembly 17 may be free standing. This may be done by incorporating some form of latch mechanism that holds the panels 18 and 19 in a sufficiently spaced position so as to minimize the likelihood that the assembly will tip over.

It is to be understood that the foregoing description is that of a preferred embodiment of the invention. Various changes and modifications may be made without departing from the spirit and scope of the invention as defined by the appended claims.

I claim:

1. A self standing freight bracing bulkhead assembly adapted to be removably positioned in a cargo carrying vehicle for bracing freight therein, said bulkhead assembly comprising a first relatively rigid panel adapted to engage and brace freight when positioned within the vehicle, a second relatively rigid panel adapted to engage and brace freight when positioned within the vehicle, means interposed between said panels for altering the distance between said panels and for urging said panels into engagement with freight, supporting means carried by said bulkhead assembly for supporting said bulkhead assembly on a floor, said supporting means being capable of supporting said bulkhead assembly on the floor when the distance between said panels is altered, a transverse extending tube positioned at the upper periphery of said bulkhead assembly and adapted to receive the tine of a fork truck or the like, and means supportingly connecting said tube and said panels for facilitating lifting of said bulkhead assembly by said tube from a position outside of the cargo carrying vehicle to a position within the cargo carrying vehicle for engagement of said panels with the freight therein.

2. A freight bracing bulkhead assembly as set forth in claim 1 wherein the means interposed between the panels includes resilient means for permitting impact induced movement of the panels toward each other.

3. A freight bracing bulkhead assembly as set forth in claim 2 wherein the resilient means includes an air bag.

4. A freight bracing bulkhead assembly as set forth in claim 1 wherein the means for supporting the panels include roller means carried at the lower peripheral edges of said panels.

5. A freight bracing bulkhead assembly as set forth in claim 1 wherein the means for supporting connects the tube and the panels comprises a linkage system positioned at the upper periphery of said panels.

6. A freight bracing bulkhead assembly as set forth in claim 5 wherein the means interposed between the panels includes an air bag.

7. A freight bracing bulkhead assembly as set forth in claim 5 wherein the means for supporting the panels include roller means carried at the lower peripheral edges of said panels.

8. A freight bracing bulkhead assembly as set forth in claim 7 further including means for holding the panels in a fixed spacing relative to each other to form a free standing assembly when not in use.

9. A freight bracing bulkhead assembly adapted to be removably positioned in a cargo carrying vehicle for bracing freight therein, said bulkhead assembly comprising a first relatively rigid panel adapted to engage and brace freight when positioned within the vehicle, a second relatively rigid panel adapted to engage and brace freight when positioned within the vehicle, a hollow tube extending across the upper periphery of the bulkhead assembly and adapted to receive a tine of a fork truck or the like for facilitating lifting of said bulkhead assembly, a first pair of links, means providing a pivotal connection between one end of each link of said first pair of links and a respective one of said panels, means providing a pivotal connection between the other ends of said links of said first pair of links of said tube, at least one of said pivotal connections of each of said links being a sliding connection, a second pair of links, means providing a pivotal connection between one end of each link of said second pair of links and a respective one of said panels, means providing a pivotal connection between the other ends of said links of said second pair of links and said tube, at least one of said pivotal connections of each of said links being a sliding connection, and at least one air bag suspended from said tube and interposed between said panels for resiliently urging said panels apart.

* * * * *